Dec. 19, 1933.   R. B. TEMPLE   1,940,617
DEMOUNTABLE WHEEL
Filed Jan. 2, 1931   2 Sheets-Sheet 1

INVENTOR.
ROBERT B. TEMPLE
BY John P. Tarbox
ATTORNEY.

Patented Dec. 19, 1933

1,940,617

UNITED STATES PATENT OFFICE 1,940,617

DEMOUNTABLE WHEEL

Robert B. Temple, Detroit, Mich., assignor to Budd Wheel Company, Philadelphia, Pa., a corporation of Pennsylvania Application January 2, 1931. Serial No. 506,129

2 Claims. (Cl. 301—9)

Serious difficulties have been encountered in the securement of disc wheels to hubs incident to the frequent breakage of the studs. These difficulties have been especially prevalent in connection with the securement of wheels to heavy vehicles such as busses and trucks. I have, therefore, sought to effect a bolting-on arrangement for securing discs to hub parts, such as annular hub flanges, in such a manner as to obviate these objections.

I have attained this object by incorporating in the studs a structure by which the discs are bolted to the hubs, and a degree of flexibility heretofore unknown in this connection is obtained. This has been effected by increasing the axial extent of the free length of stud between the hub flange and the nut which coacts with the stud. The stud is thus allowed to flex throughout a considerable portion of its length and the peak stresses on the stud are thus materially reduced and breakage avoided. The manner in which I have achieved the increase in the free length of stud between the hub flange and the zone of engagement of the threads on the nut with threads on the stud has been to counterbore the nut so that it is free of engagement with the stud for a substantial portion of its length adjacent its inner axial end.

Figures 1, 2, 3:
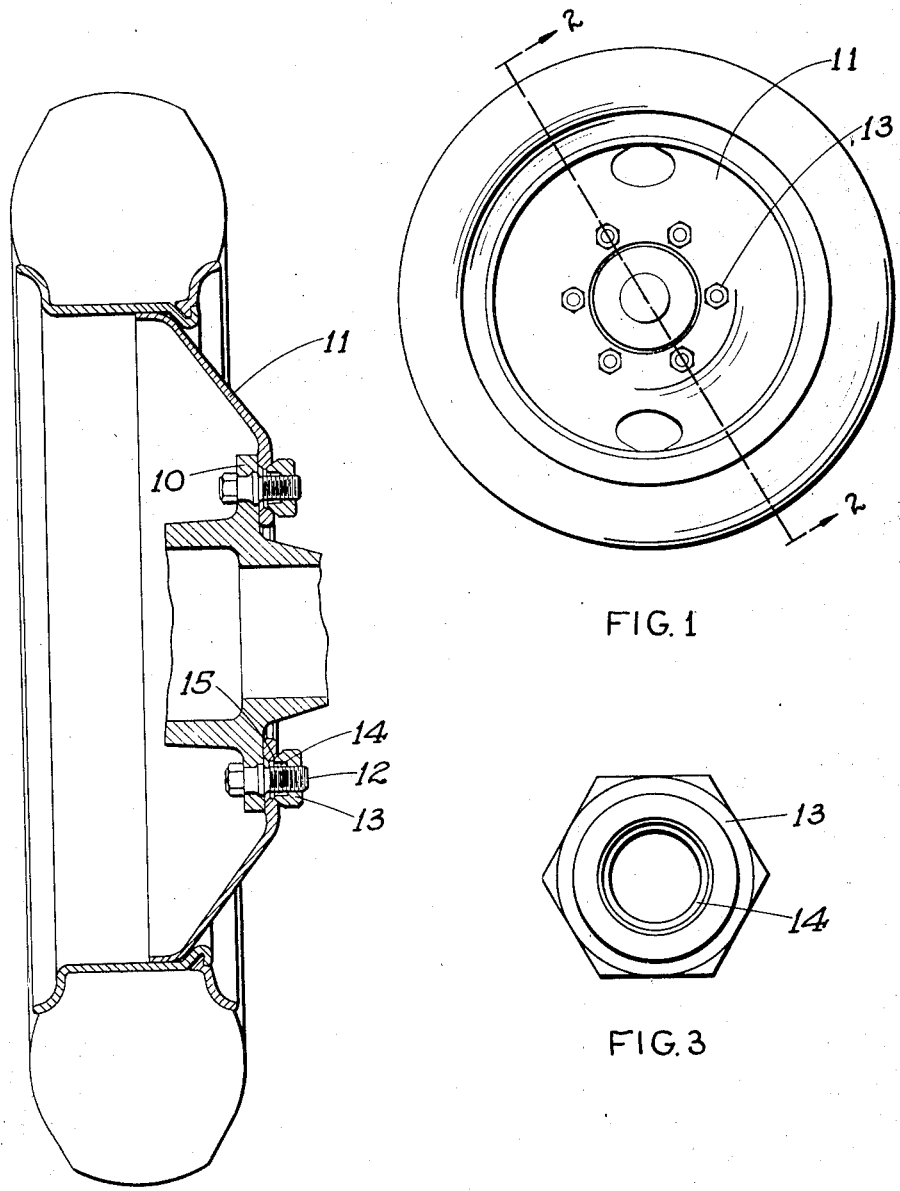
Figure 1 is a side elevation of my improved wheel.
Figure 2 is a section on line 2—2 of Figure 1.
Figure 3 is an enlarged detail view illustrating the construction of the inner end of the nut.
Figure 4:
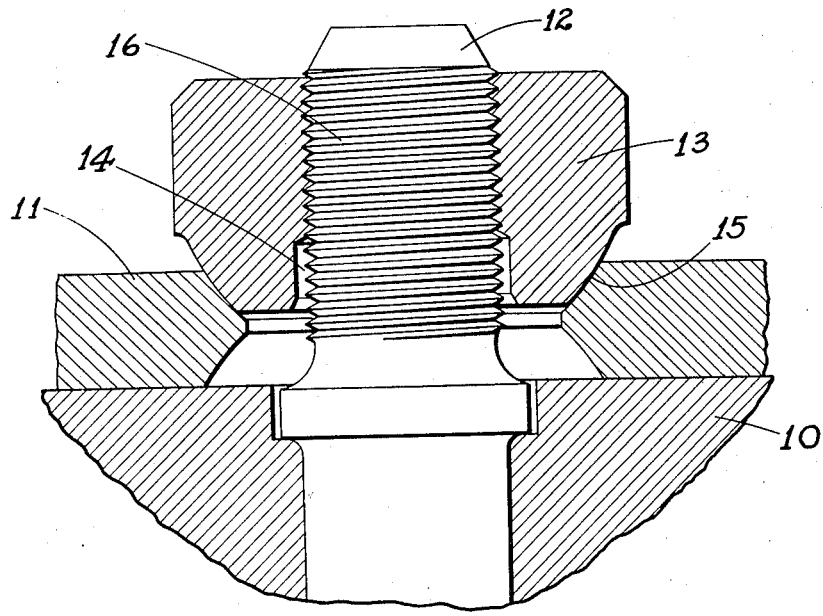
Figure 4 is an enlarged detail sectional view illustrating the wheel mounting.

Referring to the drawings by reference characters, the numeral 10 indicates a hub flange to which a disc wheel 11 is secured by means of studs 12 coacting with nuts 13 by reason of the engagement of the nuts with threaded portions 16 upon the studs. The nuts are preferably provided with beveled seats 15 which coact with beveled faces in the disc about the bolt hole openings. In all of these particulars my arrangement for securing the disc wheel to the hub flange is similar to those of the prior art.

My invention consists in the provision of a considerable free length of stud between the bearings of the stud within the hub flange and its first point of engagement with the threads in the nut 13. I have attained this free length of stud in the present instance by the act of undercutting the face of the nut which engages the disc. The length of the stud thus facilitates the flexing thereof and prevents imposition of an undue stress upon any portion thereof.

Another important advantage of this construction resides in the added resiliency of the portions of the nut adjacent the face which seats against the disc. The resilience produced in this portion of the nut due to the counterboring operation allows it to flex and thus be tightly engaged with the tapered walls of the opening with a resilient effect, thereby facilitating the securement of the wheel and preventing the nuts from working loose.

In the prior art constructions as only a short length of free stud is provided this stud is unable to flex over a substantial portion of its length upon imposition of a force and a very high stress is thus imposed in the short length of stud available for flexing. Another factor tending to destroy the stud arises in connection with the unseating of the nut due to the failure of the stud to flex. With this type of securement there is thus obtained not only a dangerously high peak stress upon the inner portion of the stud but there is an unseating of the nut which gradually tends to work it loose and is thus a potent factor in the production of stud failure.

Figure 5:
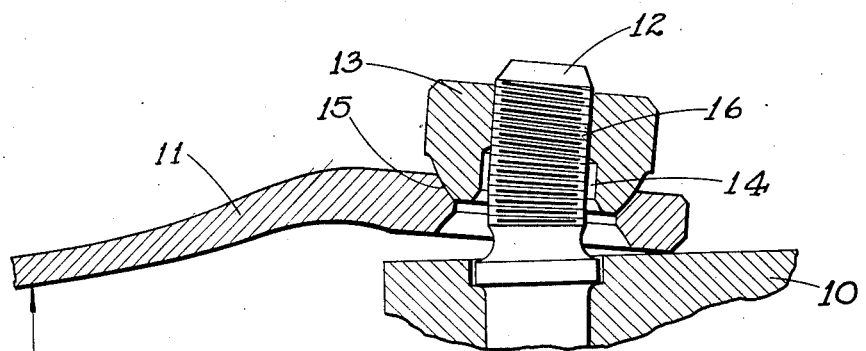
Figure 5 is a center sectional view illustrating the action of a wheel secured in the manner taught by the present invention, to a hub flange upon the imposition of a side thrust.

The action of my improved stud and nut arrangement under the same circumstances is illustrated in Figure 5. In this case, a considerable free length of stud is provided and the stud is thus enabled to flex sufficiently to avoid the imposition of any undue stress upon any particular portion thereof. Thus the nut remains seated upon the face of the wheel body throughout its annular bearing thereon and avoids the aforementioned loosening effect so notable in connection with the type of mounting of the prior art. As mentioned above, the resilience of the inner walls of the nut of Figure 5 also allows it to be wedged tightly resiliently against the wheel body and this factor also tends to avoid an unseating of the nut and obviates stud failures.

The results of actual tests have proven that the present type of mounting is incomparably superior to the former common practice. Thus is amply borne out the applicant's opinion that this type of nut eliminates the troublesome factors which so commonly effected the breakage of studs and nuts formerly used for this purpose.

Modifications will be obvious to those skilled in the art and I do not, therefore, wish to be

What I claim is:

1. A stud and nut assembly for securing a demountable wheel assembly to a hub, comprising in combination, a hub, studs seated in said hub and extending axially therefrom through enlarged bolt holes in said wheel assembly, said bolt holes having substantially beveled marginal portions, and nuts threaded onto said studs, said nuts each having a counter bore axially thereof leaving, when said nuts are seated, open annular spaces between said studs and the points of engagement of said nuts and said wheel assembly, said nuts having substantially beveled portions seated within the complemental beveled portions of said wheel assembly.

2. A stud and nut assembly for securing a demountable wheel assembly to a hub comprising, in combination, a hub, studs seated in said hub and extending axially therefrom through enlarged bolt holes in said wheel assembly, the said bolt holes having substantially beveled marginal portions, nuts threaded onto said studs, each of said nuts and studs being so related and constructed as to provide a threaded engagement between the nuts and studs, and to provide an open annular space between an inner portion of the nuts and the inner portion of the studs, said nuts having substantially beveled portions seated within the complemental beveled portions of the wheel assembly, the bolt holes of said wheel assembly being spaced from the studs to provide an annular space therebetween forming a concentric continuation of said first mentioned annular space between the nuts and studs.

ROBERT B. TEMPLE.